Dec. 3, 1946.    A. L. CHAUVET    2,411,870
UNIVERSAL SEXTANT
Filed May 31, 1943    3 Sheets-Sheet 1
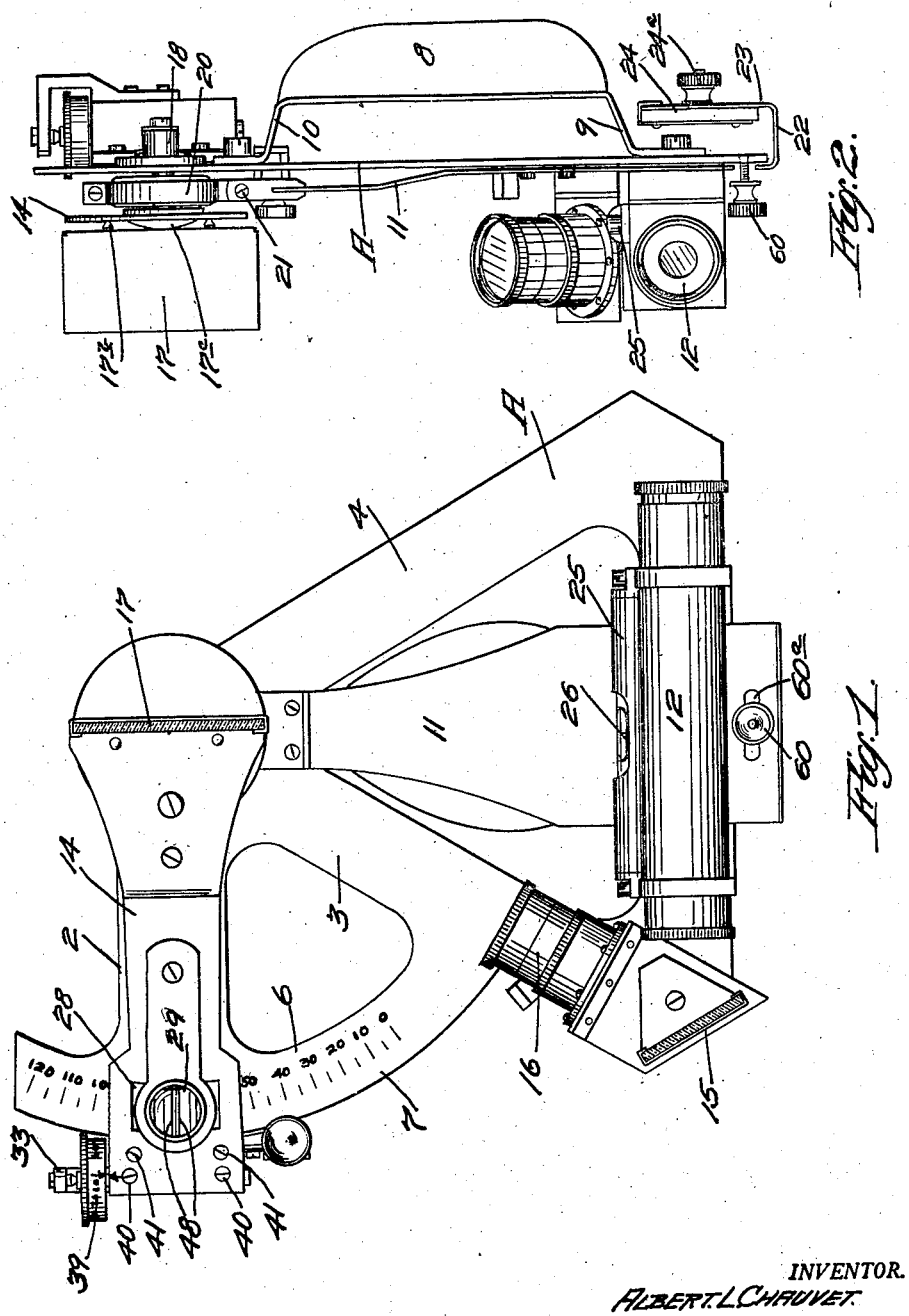
INVENTOR.
ALBERT L CHAUVET.
BY
Castberg & Roemer
ATTORNEYS

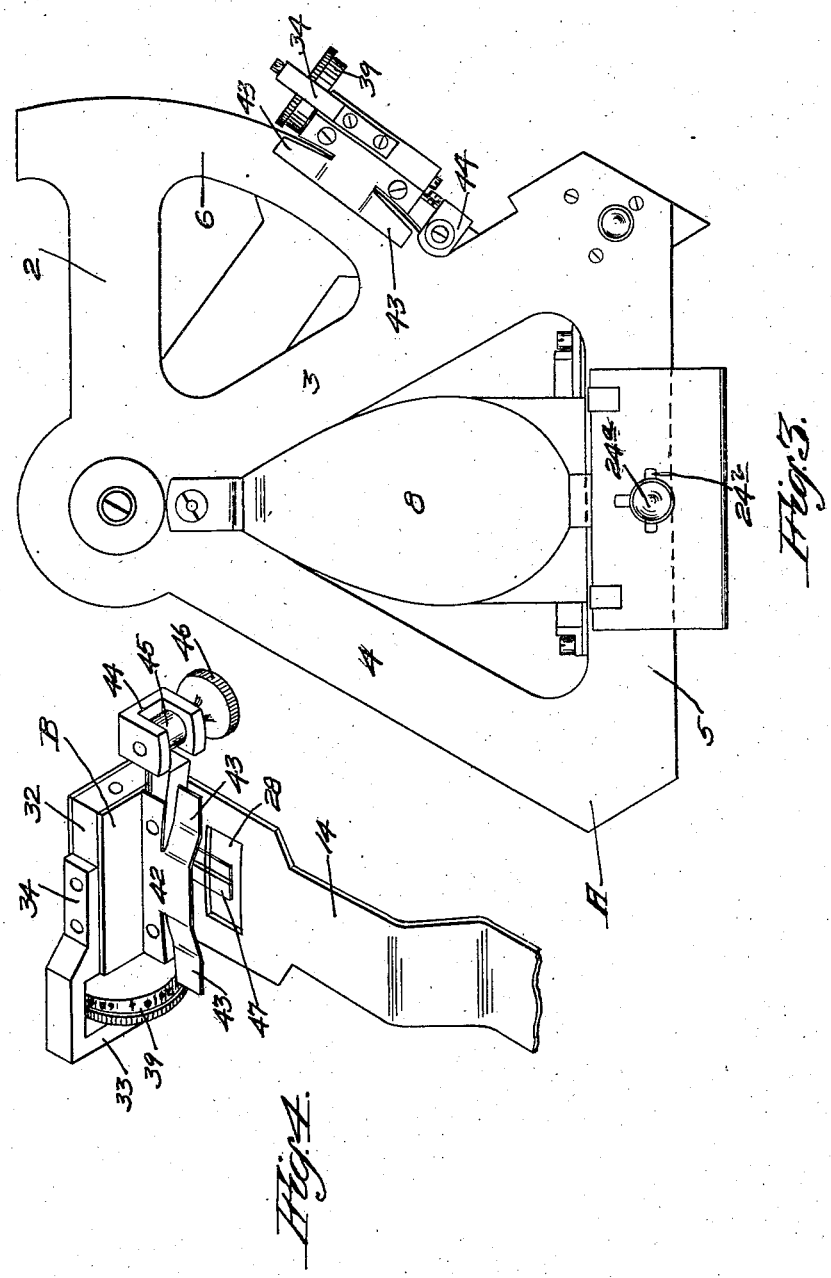

Dec. 3, 1946.     A. L. CHAUVET     2,411,870
UNIVERSAL SEXTANT
Filed May 31, 1943     3 Sheets-Sheet 3
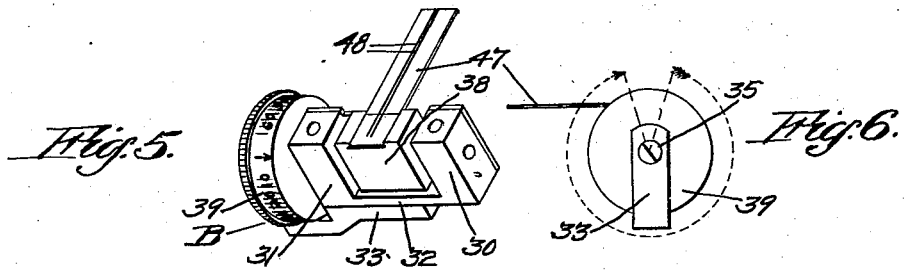
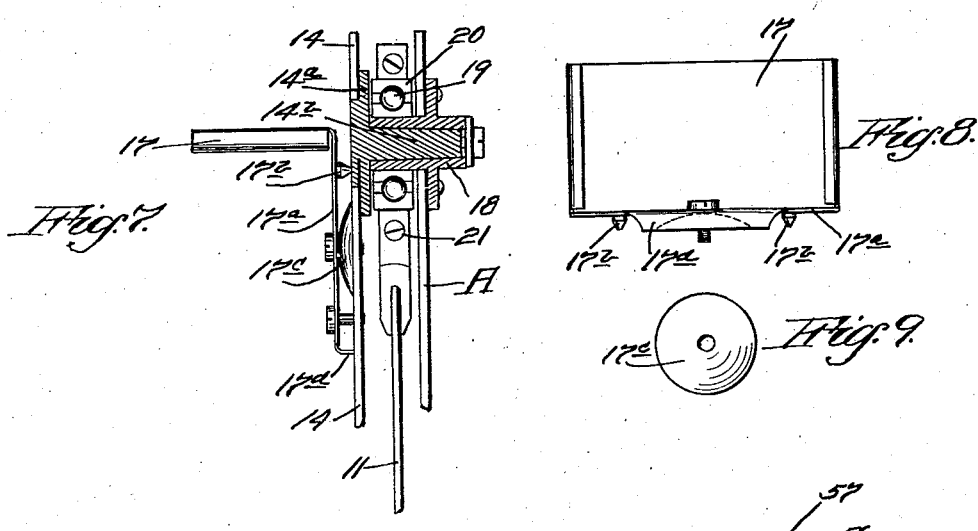
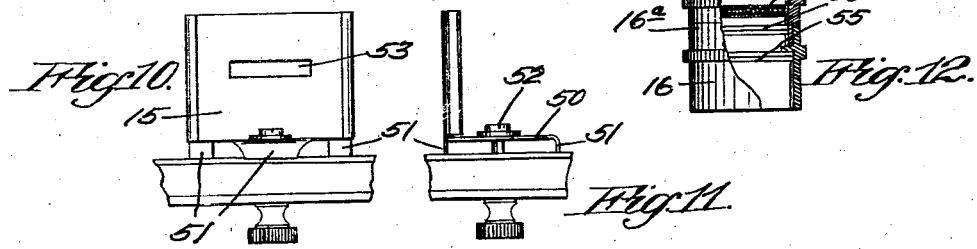
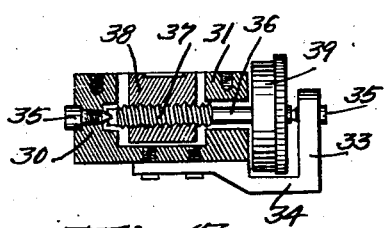
INVENTOR.
ALBERT L. CHAUVET.
BY
Castberg & Roemer
ATTORNEYS Patented Dec. 3, 1946

2,411,870

UNITED STATES PATENT OFFICE 2,411,870

UNIVERSAL SEXTANT

Albert L. Chauvet, Piedmont, Calif.

Application May 31, 1943, Serial No. 489,182

5 Claims. (Cl. 88—2.4)

This invention relates to a navigational instrument whereby measurement of celestial altitudes may be attained with speed and accuracy under conditions of visibility that would prevent the use of a standard nautical sextant.

The object of the present invention is generally to improve and simplify the construction and operation of sextants; to provide a sextant which is termed a universal sextant as it may be used as a standard sextant, and by release of a clamp is instantly converted into a sextant which may be used at night, or under conditions of visibility that would prevent the use of a standard sextant; to provide a sextant having a pendulum on which is secured a telescope, said pendulum and telescope establishing an artificial or substitute horizon through means of a cross-wire placed in the optical axis of the telescope, said cross-wire forming a line which coincides with the sensible horizon and from which all vertical angles may be measured; and further, to provide an index arm pivoted about the axis of the pendulum at one end, and movable over a graduated scale at the opposite end, said index arm being provided with a micrometer whereby the scale may be accurately read in degrees and minutes or less.

The universal sextant is shown by way of illustration in the accompanying drawings, in which:

Fig. 1 is a side elevation of the sextant, said elevation showing the index and horizon mirror in section;

Fig. 2 is an end view of Fig. 1;

Fig. 3 is a side elevation showing the rear side of the sextant;

Fig. 4 is a perspective view of the outer end of the index arm, said view showing the micrometer attached thereto;

Fig. 5 is a perspective view of the micrometer showing it removed from the index arm;

Fig. 6 is an end view of the micrometer looking from the drum end;

Fig. 7 is a vertical cross-section taken on line 7—7 of Fig. 1 but showing the index arm swung into a vertical position;

Fig. 8 is a front view of the index mirror;

Fig. 9 is a plan view of a spherical washer used in conjunction with the index mirror;

Fig. 10 is a front view of the horizon mirror;

Fig. 11 is a side elevation of the same;

Fig. 12 is a side elevation partially in section of a shaded glass tube; and

Fig. 13 is a vertical central longitudinal section of the micrometer but showing the drum and its bracket in side elevation.

Referring to the drawings in detail, and particularly Figs. 1 to 4 inclusive, A indicates in general the frame of the sextant. This frame is plate-like in construction and consists of three legs indicated at 2, 3 and 4, the legs 3 and 4 being connected by a base member 5 and the arms 2 and 3 being connected by an arcuate segment 6 which is provided with a scale 7 graduated from zero to 120 in degrees. The frame is held when in use by the handle 8 secured to the rear side thereof by bracket arms 9 and 10. The frame carries a pendulum arm 11 on the lower end of which is secured a telescope 12. The frame also carries an index arm generally indicated at 14, and in addition thereto, the frame carries a horizon mirror 15 and a shaded glass tube 16, while the index arm carries an index mirror indicated at 17.

The pendulum is mounted to swing about a pivot which is best shown in Fig. 7. That is, the frame proper indicated at A has a bushing secured thereto as at 18. Disposed outside the bushing is an antifriction ball bearing 19 and mounted freely to swing on the bearing is a collar 20 from which the pendulum 11 is suspended, a pivotal connection 21 being, however, formed between the collar and the pendulum arm so that it may also swing in a direction at right angles to the frame.

The telescope tube is secured in any suitable manner to the front face of the pendulum arm, and besides that of serving as a telescope, it also serves as the bob or weight of the pendulum. The pendulum arm is bent at right angles at its lower end as indicated at 22 in Fig. 2, and extended upwardly at right angles as shown at 23 on the rear side of the frame, and it carries a counter weight 24 which is adjustable longitudinally to compensate for any adjustment of the telescope 12, as will hereinafter be described.

The telescope also carries a spirit level 25 (see Fig. 1), so adjusted by the manufacturer that when the pendulum is swinging freely, then the optical axis of the telescope will point to the sensible horizon. The spirit level or bubble used is tubular. It is calibrated and should be correct to not more than one-quarter minute of an arc, or fifteen seconds. The telescope consists of a tube with an ordinary object glass and a wide angle positive eye piece to give a broad field. A horizontal cross wire, not shown, passing through the optical axis at the focus of the eye-piece of the telescope coincides with the sensible horizon when proper adjustments have been made. This cross wire is used as a line from which all vertical angles may be measured.

The index arm 14 is pivoted to revolve about the same axis as the pendulum. The arm proper is secured to a collar 14a, and this in turn is provided with a pin 14b which extends through the bushing 18 and is rotatable therein, the pin 14b and the index arm carried thereby being secured against removal by a washer and screw as clearly shown in Fig. 7. The index arm carries an index mirror generally indicated at 17. This mirror is mounted on a plate 17a and is spaced from the arm 14 by pointed pins 17b, by a spherical washer 17c, and by a flange 17d. Two screws are provided, one extending through the spherical washer and one being disposed at a point adjacent the flange 17d. These screws adjustably secure the index mirror to the index arm and thereby permit correction or adjustment whenever necessary. The index arm has an elongated reading slot formed in it adjacent its outer end as indicated at 28 (see Fig. 1), and it is also provided with an adjustable magnifying glass 29 which is normally disposed above the reading slot.

To the rear face of the index arm is secured a micrometer generally indicated at B (see Figs. 4, 5 and 13). This micrometer consists of a U-shaped bracket having two arms 30 and 31 connected by a base section 32. A third bracket arm is disposed at 33 and this is secured to the base 32 by an arm 34. In the arms 30 and 32 are disposed pointed screws 35 between which is journalled a rod 36 having a threaded portion 37. On the threaded portion between the arms 30 and 31 is disposed a nut 38, and secured on a rod between the arms 31 and 33 is a drum 39 which is graduated from zero to sixty in minutes. The upper ends of the arms 30 and 31 are drilled and tapped to receive screws 40 whereby the micrometer as a whole is secured to the rear side of the index arm. Two other screws pass through the index arm as indicated at 41, and these secure a plate 42 from which extend two spring arms 43 which frictionally engage the rear surface of the arcuate member 6 to frictionally secure the index arm against free movement. The index arm also carries a small bracket 44 (see Fig. 4) in which is journalled a slow motion tangent friction roller 45 which is rotated by means of a knob 46. The tangent friction roller 45 engages the outer knurled peripheral edge of the arcuate member carrying the degree scale 7, and when knob 46 is grasped and rotated, it swings the index arm up or down the scale. The nut 38 previously referred to carries an index finger 47 (see Figs. 5 and 6). This index finger is made of a transparent material such as Celluloid or one of the transparent plastics. It overlies the scale 7 which is divided into degrees, and as it is transparent, it makes it possible to read this scale through the magnifying glass and the slot 28. The index finger 47 has two visible lines formed thereon as shown at 48 in Fig. 5. These lines are placed closely together but must be spaced a sufficient distance apart to permit a degree line to be seen between them with a slight margin on each side. The function of the lines 48 will hereinafter be described.

The horizon mirror indicated at 15 is provided with a plate bent at right angles thereto as shown at 50. This plate has foot lugs formed thereon as shown at 51, and a screw passing through the plate, as at 52, and into the frame forms a means of securing the mirror to the frame, and it also forms a pivot about which the horizon mirror may be swung when it is adjusted. The horizon mirror has a non-silvered slot 53 formed therein so as to verify parallelism between the horizon and index mirrors, and, when necessary, to view objects directly.

To one side of the horizon mirror or between said mirror and index mirror is disposed a tube 16 such as shown in Figs. 1 and 12. This serves the purpose of a sunshade. For instance, in taking an altitude of the sun, the eye must be protected by reducing the intensity of the sun's rays. This is accomplished by mounting two polarizing discs within the tube 16 as indicated at 55 and 56. The disc 55 is stationary, and is secured in the lower portion of tube 16, while the disc 56 is carried by a tube section, 16a, which telescopes with relation to the tube 16, and is rotatable. Rotation of this disc increases and decreases light-ray transmission and light intensity may be further reduced by mounting a dark colored glass of the type used by welders at the point indicated at 57. The combination of polarizing and colored discs shown in Fig. 12 is, of course, only intended for daylight use and particularly for observations on the sun, but it must, of course, be substituted by a tube containing clear glass when observations are taken at night, for instance, on the moon and stars. Ordinarily, when substituting clear glass for the colored glass shown in Fig. 12, changing of the focus of the telescope would be necessary, but as the plain glass used in this instrument is designated to have the same refractive effect as the lightray reducing medium or discs shown in Fig. 12, the telescope may remain in constant focus both for day and night observations. This is important as the telescope forms the bob or weight of the pendulum, and any adjustment of the telescope, if this were necessary, would throw the pendulum, or rather the spirit level, out of adjustment, but as both sets of glass, whether clear glass or the type shown in Fig. 12, have the same refractive effect, adjustment of the telescope becomes unnecessary and, as previously stated, may remain fixed. A counterweight 24 disposed on the rear side of the pendulum arm is provided to obtain the necessary adjustment of the pendulum and the spirit level. This weight is longitudinally movable on its support as the screw 24a securing it operates in an elongated slot 24b (see Figs. 1 and 2). This weight, when properly adjusted, insures correct positioning of the bubble in the spirit level and as the telescope tube requires no further adjustment thereafter, the optical system of the telescope may remain fixed. If it were not fixed, it would be necessary to adjust the weight 24 from time to time, which would be time consuming and a nuisance.

It was previously stated that the sextant might be employed as a standard nautical sextant. To permit this a clamping screw 60 is provided (see Figs. 1 and 2). This passes through a slot 60a formed in the lower end of the pendulum arm, and when it is clamped, it clamps the pendulum arm and the telescope to the frame A. Conversely, by releasing the screws 60, the pendulum becomes free to swing both in a direction parallel to the face of the sextant frame, and in addition thereto has a limited swinging movement about the pivot 21 in a direction at right angles to the face of the frame. Both of these movements are essential to permit the freest possible movement of the pendulum, furthermore the ends of the slot 60a serve as stops to limit the movement or swing of the pendulum.

Before taking an observation, the instrument should be checked for accuracy. The instrument is held by the handle in the right hand so that the pendulum swings freely—the bubble should be at its central position and in adjustment.

The pendulum is then held against the frame by the fingers and thumb of the right hand with the telescope as far forward as it will swing with the pendulum against the frame stop or bumper. With the telescope thus clamped a distant object or star is viewed through the telescope, and its direct image is viewed through the slot in the horizon glass, and its image reflected through the index glass should coincide. Held thus, the zero mark on the drum should be at its index point. The zero line of the arc should be exactly midway between the double lines on the micrometer index finger. With these conditions verified the instrument is ready for observation. On a star, for example, with the index arm pushed upward, the star is located by sighting over the top of the telescope and along the plane of the instrument. Holding the instrument very steadily with the telescope swinging freely, almost touching the frame, and at the same time barely bumping against the stop, the object is brought into view in the field of the telescope by means of the tangent roller knob and lowered until its image comes in contact with the horizon cross wire. The altitude is measured by noting the next lowest degree on the arc scale just below the double index lines. The tangent knob is then turned until this lowest degree line bisects the space between the double index lines. The altitude then is the degree reading plus the drum reading in minutes, an operation requiring but a few seconds of time.

The novelty lies in the fact that the pitch of screw corresponding to one revolution of the drum must be greater than the corresponding space to be measured on the scale so that one revolution of the drum advances the double line along the scale a distance greater than that between two lines of the scale. Therefore, if at zero of the drum a line of the scale bisects the space between the double lines, then the next line of scale will again bisect the space between the double lines before the drum can make one complete revolution. The advantage of this is that any screw die can be used to cut the thread as long as its pitch is greater than the spaces between the arc lines. All the micrometer has to do is to measure a distance with less than one turn of the drum. Therefore, the drum can be accurately divided without difficulty to read any degree of precision. The reading is almost instantaneous and the micrometer is inexpensive to make.

The use of a spirit level or bubble to establish an artificial or substitute horizon is not new, as a number of bubble sextants are in use. Bubble sextants are difficult to use as it is practically impossible to hold the spirit level in the hands and maintain the bubble in its central position for more than an instant. In other words, the bubble sextants in use are not provided with means for stabilizing the bubble. By providing a pendulum and mounting the spirit level thereon, as in the present structure, the bubble is stabilized and is readily maintained at rest in a central position thereby insuring that the telescope which forms the bob of the pendulum will point precisely to the sensible horizon.

In bubble sextants now in use, the bubble is visible in the optical axis of the telescopes, hence, the object being observed together with the bubble must be viewed at the same time. Furthermore, a source of electric current must be provided in the form of dry batteries or the like as the bubble must be illuminated at night by a small electric bulb in order to be seen. In the present instrument, the cross-wire and the object being observed are the only things which can be seen in the optical system. The bubble is not viewed, hence no illumination is required during night observations.

The sextant shown in this application is designed for low cost production. It requires a minimum of material and as actually designed weighs about one pound. Practically all parts are stamped or cut from sheet metal as they are flat, and the only other parts employed are of rod or tubular form. Such a structure permits a compact simple assembly, low cost, light weight, as aluminum alloys, stainless steel and like metals may be employed. Also the optical parts are of the simplest nature and inexpensive even though producing excellent results.

Having thus described my invention, what I claim and desire to secure by Letters Patent is:

1. A sextant comprising a frame, a pendulum pivotally mounted on said frame, a telescope carried by the pendulum to view an object observed, said telescope having cross-hairs to maintain a substitute horizon, a horizon mirror carried by the frame and disposed in front of the telescope, an index arm pivotally mounted on the frame, a scale for the index arm to indicate the angle of elevation of the observed object above the horizontal, and an index mirror carried by the index arm to reflect an object being observed to the horizon mirror and the telescope.

2. A sextant comprising a frame, a pendulum pivotally mounted on said frame, a telescope carried by the pendulum to view an object observed, said telescope having cross-hairs to maintain a substitute horizon, a horizon mirror carried by the frame and disposed in front of the telescope, an index arm pivotally mounted on the frame, a scale for the index arm to indicate the angle of elevation of the observed object above the horizontal, an index mirror carried by the index arm to reflect an object being observed to the horizon mirror and the telescope, and means carried by the frame for controlling the intensity of light entering the telescope.

3. A sextant comprising a frame, a pendulum pivotally mounted on said frame, a telescope carried by the pendulum to view an object observed, said telescope having cross-hairs to maintain a substitute horizon, a horizon mirror carried by the frame and disposed in front of the telescope, an index arm pivotally mounted on the frame, a scale for the index arm to indicate the angle of elevation of the observed object above the horizontal, an index mirror carried by the index arm to reflect an object being observed to the horizon mirror and the telescope, and means interposed between the index and horizon mirror for controlling intensity of light reflected into the telescope.

4. A sextant comprising a frame, a pendulum pivotally mounted on said frame, a telescope secured to the pendulum to view an object observed, said telescope having cross-hairs to maintain a substitute horizon a spirit level carried by the telescope and having a bubble to indicate when the telescope points to the sensible horizon, a horizon mirror secured to the frame in front of the telescope, an index arm rotatable about the same pivot as the pendulum, a scale for the index arm to indicate the angle of elevation of the observed object above the horizontal, and an index mirror carried by the index arm to reflect the object being observed to the horizon mirror and the telescope.

5. A sextant comprising a frame, a pendulum pivotally mounted on said frame, a telescope secured to the pendulum to view an object observed, said telescope having cross-hairs to maintain a substitute horizon a spirit level carried by the telescope and having a bubble to indicate when the telescope points to the sensible horizon, a horizon mirror secured to the frame in front of the telescope, an index arm rotatable about the same pivot as the pendulum, a scale for the index arm to indicate the angle of elevation of the observed object above the horizontal, an index mirror carried by the index arm to reflect the object being observed to the horizon mirror and the telescope, and an adjustable counterweight carried by the pendulum.

ALBERT L. CHAUVET.